United States Patent
Yan et al.

(10) Patent No.: US 10,046,979 B2
(45) Date of Patent: Aug. 14, 2018

(54) SYSTEM AND METHOD FOR RECYCLING RARE EARTH AND AMMONIA NITROGEN FROM RARE EARTH WASTEWATER

(71) Applicant: CHINA UNIVERSITY OF GEOSCIENCES (WUHAN), Wuhan, Hubei (CN)

(72) Inventors: Chunjie Yan, Hubei (CN); Sen Zhou, Hubei (CN); Luru Jing, Hubei (CN); Chen Liu, Hubei (CN); Youfa Zhu, Hubei (CN); Zhenhua Wang, Hubei (CN); Xujian Li, Hubei (CN); Tian Liang, Hubei (CN)

(73) Assignee: CHINA UNIVERSITY OF GEOSCIENCES (WUHAN), Wuhan, Hubei (CN)

( * ) Notice: Subject to any disclaimer, the term of this patent is extended or adjusted under 35 U.S.C. 154(b) by 90 days.

(21) Appl. No.: 15/353,247

(22) Filed: Nov. 16, 2016

(65) Prior Publication Data
US 2017/0137300 A1  May 18, 2017

(30) Foreign Application Priority Data

Nov. 17, 2015 (CN) .......................... 2015 1 0788638

(51) Int. Cl.
*C01F 17/00* (2006.01)
*B01J 39/04* (2017.01)
(Continued)

(52) U.S. Cl.
CPC .......... *C01F 17/0006* (2013.01); *B01J 20/10* (2013.01); *B01J 20/20* (2013.01); *B01J 39/07* (2017.01); *B01J 47/12* (2013.01); *C01C 1/022* (2013.01); *C01C 1/12* (2013.01); *C02F 9/00* (2013.01); *C02F 1/001* (2013.01); *C02F 1/16* (2013.01); *C02F 1/20* (2013.01); *C02F 1/281* (2013.01); *C02F 1/283* (2013.01); *C02F 1/286* (2013.01); *C02F 1/40* (2013.01); *C02F 1/42* (2013.01); *C02F 1/44* (2013.01); *C02F 1/52* (2013.01); *C02F 1/66* (2013.01);
(Continued)

(58) Field of Classification Search
CPC ... B01J 20/10; B01J 20/20; B01J 39/07; B01J 47/12; C01F 17/0006; C02F 1/001; C02F 1/16; C02F 1/20; C02F 1/281; C02F 1/283; C02F 1/286; C02F 1/40; C02F 1/42; C02F 1/44; C02F 1/52; C02F 1/66; C02F 2001/007; C02F 2103/10
See application file for complete search history.

(56) References Cited

FOREIGN PATENT DOCUMENTS

CN          103570158 A  *  2/2014

* cited by examiner

*Primary Examiner* — Dirk Bass
(74) *Attorney, Agent, or Firm* — Tim Tingkang Xia, Esq.; Locke Lord LLP

(57) ABSTRACT

A method for recycling rare earth from a wastewater from rare earth mining or from rare earth smelting, includes the steps of: removing oil from the wastewater to obtain a degreased wastewater; purifying the degreased wastewater to obtain a purified wastewater using a pretreatment system; recycling rare earth from the purified wastewater to obtain a rare earth slurry and a low rare earth wastewater using a rare earth recycling tank; treating the low rare earth wastewater to obtain ammonia gas using an ammonium degassing device; and converting the ammonia gas to obtain aqueous ammonia using an aqueous ammonium preparing system.

16 Claims, 1 Drawing Sheet

(51) Int. Cl.
*B01J 47/12* (2017.01)
*C02F 9/00* (2006.01)
*B01J 20/10* (2006.01)
*B01J 20/20* (2006.01)
*B01J 39/07* (2017.01)
*C01C 1/02* (2006.01)
*C01C 1/12* (2006.01)
*C02F 1/00* (2006.01)
*C02F 1/20* (2006.01)
*C02F 1/28* (2006.01)
*C02F 1/40* (2006.01)
*C02F 1/42* (2006.01)
*C02F 1/44* (2006.01)
*C02F 1/52* (2006.01)
*C02F 1/66* (2006.01)
*C02F 103/10* (2006.01)
*C02F 1/16* (2006.01)
*C02F 103/16* (2006.01)

(52) U.S. Cl.
CPC .... *C02F 2001/007* (2013.01); *C02F 2103/10* (2013.01); *C02F 2103/16* (2013.01); *C02F 2209/001* (2013.01); *C02F 2209/003* (2013.01); *C02F 2209/03* (2013.01); *C02F 2209/14* (2013.01)

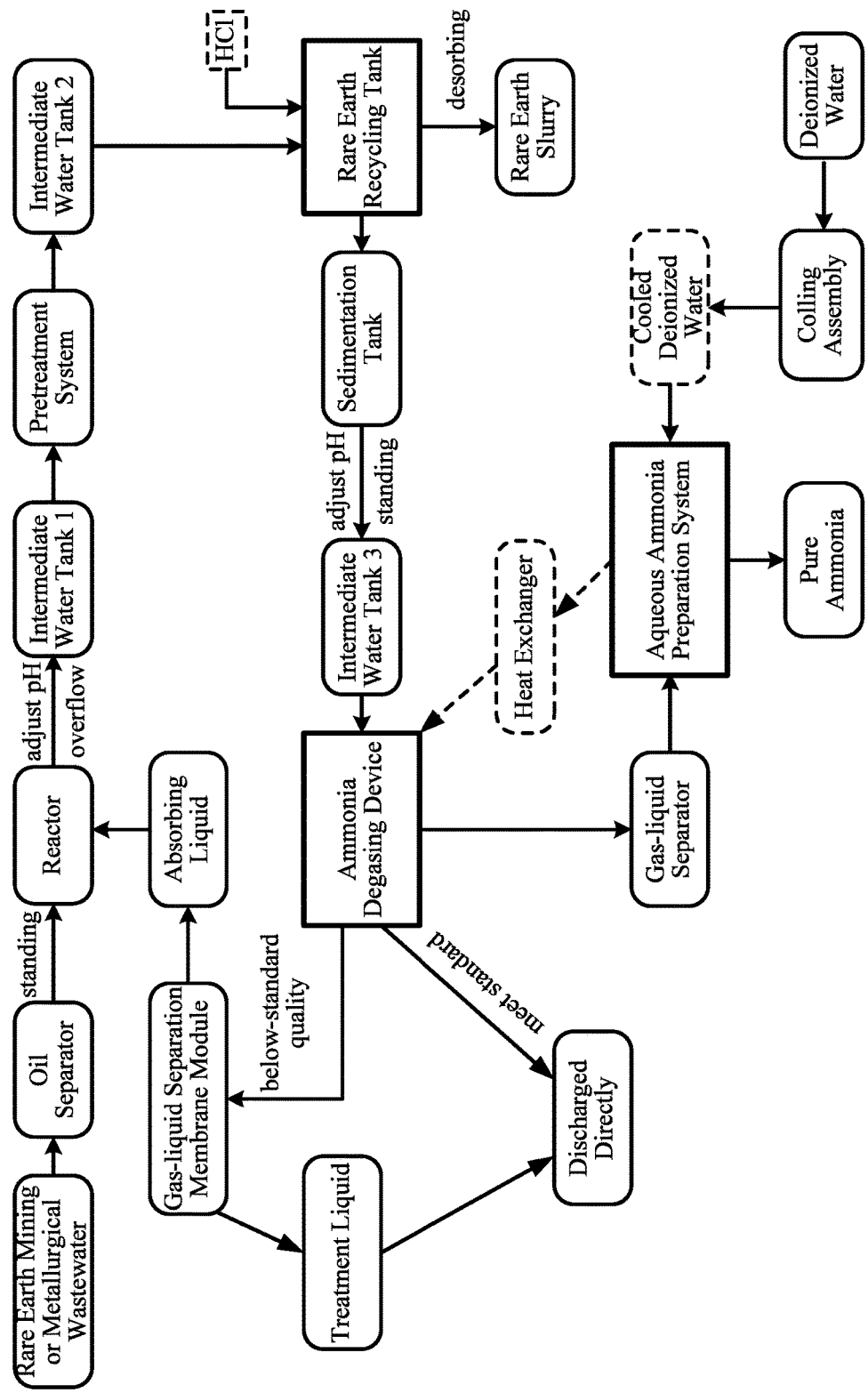

SYSTEM AND METHOD FOR RECYCLING RARE EARTH AND AMMONIA NITROGEN FROM RARE EARTH WASTEWATER

CROSS-REFERENCE TO RELATED APPLICATIONS

This non-provisional application claims priority under 35 U.S.C. § 119(a) on Patent Application No. 201510788638.0 filed in China on Nov. 17, 2015, the entire contents of which are hereby incorporated by reference.

BACKGROUND OF THE INVENTION

Technical Field

The present invention relates generally to recycling and utilizing of mineral resources, and particularly to a method for recycling and utilizing wastewater from rare earth mining and waste water from rare earth metallurgy.

Related Art

Rare earth has long been widely used in industry, agriculture, national defense, medicine and new materials. However, large quantities of wastewater produced during mining and smelting separation of rare earth have serious impact on the surrounding environment. Due to the numerous species and high concentrations of impurities contained in the rare earth wastewater, it is hard to make the wastewater meet standards after centralized treatment using conventional methods. The rare earth wastewater from mining process and metallurgy is rich in rare earth ions, and the direct discharging of the wastewater, not only reduces the recovery rate of the rare earth, but also causes a great waste of rare earth resources. Meanwhile, discharging of excessive ammonia nitrogen in the wastewater to the natural water body may cause eutrophication of the water body, thus seriously destroying the ecological balance in the water. Therefore, the recovery of valuable rare earth elements from the rare-earth wastewater is very necessary, and the treatment of ammonia nitrogen in the wastewater also becomes imminent.

During the smelting separation of rare earth, sodium hydroxide saponification is currently used in the field. However, hydrolysis of the saponification agent may easily occur, and the remaining sodium ions in the liquid affect the purity of the rare earth product. If the saponification is carried out with aqueous ammonia, at least 10% of the organic saponification agent can be saved, and the obtained rare earth product has high purity, and no impurity ion residue, thus effectively increasing the separation efficiency and the product purity. However, upon saponification with aqueous ammonia, the wastewater contains high concentration of ammonia nitrogen, and thus cannot be discharged up to standards.

At present, processes for recycling rare earth in the rare earth wastewater mainly include electric reduction, liquid-membrane extraction and bio-enrichment. Although the electric reduction has the advantages of fast speed and high efficiency, problem of large electrical energy consumption exists, which restricts its generalized use. The liquid-membrane extraction has the advantages of high extraction efficiency and low cost. However, the liquid membrane production process is complex, and requires a surfactant or requires emulsification and demulsification processes. The treatment of rare earth wastewater by bio-enrichment has the advantages of being clean and environmentally friendly, but suffers from longer treatment cycle and influence from temperature.

Existing methods for removing ammonia nitrogen in the rare earth wastewater include blow-off method, stripping, adsorption, chemical precipitation, electrodialysis, biological method, break point chlorination and so on. The advantages and disadvantages of various treatment methods are shown in Table 1.

TABLE 1

Method for removing ammonia nitrogen from rare earth wastewater.

| Treatment method | Advantages | Disadvantages |
| --- | --- | --- |
| Blow-off | Simple process, stable effect, high adaptability, and low investment | Large energy consumption, presence of secondary pollution, and relatively high ammonia nitrogen in the effluent |
| Air stripping | Mature and stable process | Large energy consumption, and poor treatment effect for low level ammonia nitrogen |
| Electrodialysis | Low energy consumption, small size, and simple operation | Prone to concentration polarization and fouling |
| Precipitation | Simple process, convenient operation, and fast reaction | Large dosage, and high cost |
| Break point chlorination | Fewer equipment, convenient operation, and fast reaction | Difficulty in control of the break point, high cost, and easy production of trihalomethane from reaction of organic compounds in water and chlorine gas |
| Ion exchange | Simple process, convenient operation, and low investment | Limited exchange capacity, frequent desorption, and need for being used in combination with other processes, or as part of deep processing |
| Biological method | Mature process, and good denitrification effect | High initial investment, long process, huge reactor, mass land occupation, frequent need for additional carbon source, large energy consumption, and high cost |

To sum up, rare earth recycling and ammonia nitrogen removing from mineral processing and metallurgical wastewater are separated processes in most cases, and the recovery of the rare earth resources and the discharge of ammonia nitrogen up to standards cannot be achieved at the same time. The treatment methods and modes of implementation used for wastewater from different procedures are not the same, and the ammonia nitrogen wastewater cannot be treated while recovering the rare earth. Most of the existing modes for treating the ammonia nitrogen wastewater of different concentrations include many methods used in combination. These technologies often have the problems of complex process, high treatment cost, large investment and unsatisfactory results.

SUMMARY OF THE INVENTION

In certain aspects, the present invention relates to an integrated new treatment method for recycling rare earth and recycling ammonia nitrogen resource from rare earth production wastewater.

In certain embodiments, a recycling and utilizing method for treating wastewater from rare earth mining wastewater and metallurgical wastewater includes the following steps.

1) Feeding rare earth mining wastewater and/or metallurgical wastewater to an oil separator (or an oil separation tank) at a flow rate of 1000-3000 liters/hour (L/h), letting the wastewater stand, and then removing the oil; and guiding the wastewater after oil removal to a reaction tank, adjusting the wastewater to pH 3-5, and feeding the wastewater to an intermediate water tank 1 by overflowing.

2) Introducing the wastewater with adjusted pH in the intermediate water tank 1 to a pretreatment system for purification using a lift pump; and introducing the wastewater after purification to an intermediate water tank 2.

3) Introducing the wastewater in the intermediate water tank 2 to a rare earth recycling tank, by using an elevator pump at a flow rate of 100-3000 L/h, where the recycling tank is filled with a rare earth recycling material; flowing the wastewater to a sedimentation tank after the rare earth in the wastewater is recycled; and treating the rare earth recycling material with hydrochloric acid after it reaches saturated adsorption, to obtain a rare earth slurry.

4) Adding an alkali (base) to the wastewater in the sedimentation tank, to adjust the pH to 10-13; standing; then introducing the wastewater with adjusted pH by overflowing to an intermediate water tank 3; pumping the wastewater in the intermediate water tank 3 to an ammonia degassing device using a lift pump, where in the ammonia degassing device, ammonia nitrogen is converted into ammonia, and the ammonia is vacuumed to a gas-liquid separator using a vacuum pump; and detecting whether ammonia nitrogen in the wastewater after treatment in the ammonia degassing device meets the required standard, if yes, discharging the wastewater directly via a drain pipe; and if not, introducing the wastewater to a gas-liquid separation membrane module, and further treating the ammonia nitrogen in the wastewater by controlling the pressure difference between the exterior and interior of the membrane of the gas-liquid separation membrane module such that the wastewater travels inside the membrane, and the absorbing solution sulfuric acid travels outside the membrane; and after treatment, discharging the wastewater that meets the required standard, and feeding the absorbing solution back to the reaction tank via a pipe.

5) After separation in the gas-liquid separator, drawing ammonia to an ammonia preparation system by a suction fan, to obtain pure aqueous ammonia (or ammonia, or ammonia water, or ammonium hydroxide).

In certain embodiments, the pretreatment system includes a walnut shell filter tank, a manganese sand filter tank, a quartz sand filter tank, and an activated carbon filter tank.

In certain embodiments, the rare earth recovery material is a weakly acidic ion exchange fiber, a weakly acidic ion exchange fabric, or an inorganic-organic composite ion exchange material.

In certain embodiments, the rare earth recovery tank generally includes a tank in use, a tank being washed, and a standby tank connected in parallel, the state of which is controlled by a valve. When the rare earth recovery material in a certain rare earth recovery tank reaches saturated adsorption, the valve is closed, and a ready rare earth recovery tank is opened. The rare earth recovery material reached saturated adsorption is desorbed using a hydrochloric acid solution, and the desorption solution is collected and fed to a recovery tank, to obtain a rare earth slurry.

In certain embodiments, the ammonia preparation system consists of a gas-liquid separation membrane, a deionized water cooling assembly, and an aqueous ammonia collection tank. The ammonia is allowed to enter inside the gas-liquid separation membrane, and diffuse from interior to exterior of the membrane by controlling the pressure difference between the exterior and interior of the membrane, then absorbed with deionized water cooled to below 5° C. as an absorbent, and prepared into pure aqueous ammonia which is fed to the aqueous ammonia collection tank. The heat generated during cooling the deionized water is used to heat the ammonia degassing unit by means of heat exchange.

It can be known from the above technical solution that in the present invention, an ion exchange material with excellent performances is used to recover the rare earth of high economic value; and then ammonia nitrogen is directly converted into ammonia by means of the ammonia degassing unit, then separated by using the gas-liquid separation membrane, absorbed with cooled deionized water, and prepared into pure aqueous ammonia. After treatment, the ammonia nitrogen in the wastewater is discharged up to standard. The process is simple, has low cost, small investment, and obvious treatment effect, and can fully guarantee the discharge up to standards of ammonia nitrogen. The prepared aqueous ammonia can be used in the rare earth smelting separation procedure without causing secondary pollution. Therefore, the method of the present invention is an efficient and economical method for recycling rare earth and recycling ammonia nitrogen in the wastewater from rare earth production.

Certain embodiments of the present invention have the following beneficial advantages.

The method has the advantages of low cost, small investment, simple process and obvious treatment effect. The ammonia nitrogen resource in the wastewater is prepared into aqueous ammonia by the membrane technology, such that an economic value can be produced without causing secondary pollution.

In certain embodiments of the present invention, the heat generated during the preparation of cooled water is recovered by the heat exchange technology and used to heat the ammonia nitrogen wastewater, thereby greatly reducing the energy consumption during treatment.

Through the technical implementation in the present invention, the saponification with sodium hydroxide in the rare earth smelting separation industry is transformed into saponification with aqueous ammonia, thereby saving the dosage of agent used and improving the product quality.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention.

FIG. 1 schematically depicts a flowchart of a method according to certain embodiments of the present disclosure.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The following examples further illustrate the technical solutions of the present invention, and should not be construed as limiting the scope of the invention.

FIG. 1 schematically shows a flow chart of recycling rare earth and utilizing ammonia nitrogen resource from rare earth mining wastewater and rare earth metallurgical wastewater according to certain embodiments of the present invention. As shown in FIG. 1, the method includes the following steps.

(1) Wastewater from rare earth mining or rare earth metallurgy (or smelting) is provided. The wastewater is flowed to an oil separator at a flow rate of 1000-3000 L/h. The wastewater flowed into the oil separator is kept standing for a moment, and then subjected to oil removing. After oil removal, the wastewater is guided to a reactor. The pH of the wastewater in the reactor is adjusted to pH 3-5. Then the wastewater flows to an intermediate water tank 1 by overflowing. In certain embodiments, the wastewater after oil removal is named degreased wastewater.

(2) The wastewater with adjusted pH in the intermediate water tank 1 is pumped to a pretreatment system for purification using a lift pump. In certain embodiments, the pretreatment system includes a walnut shell filter tank, a manganese sand filter tank, a quartz sand filter tank, and an activated carbon filter tank. After purification by the pretreatment system, the wastewater is guided to an intermediate water tank 2. In certain embodiments, the wastewater after treatment by the pretreatment system is named purified wastewater or calcified wastewater.

(3) The wastewater in the intermediate water tank 2 is drained using a lift pump to a rare earth recovery tank at a flow rate of 100-3000 L/h. The rare earth recovery tank is filled with a self-developed rare earth recycling material. After the rare earth is recycled, the wastewater in the rare earth recovery tank flows to a sedimentation tank. In certain embodiments, the wastewater flowed to the sedimentation tank contains no or low concentration of rare earth material, thus is named low rare earth wastewater. In certain embodiments, the rare earth recovery tank includes a tank in use, a tank being washed, and a standby tank connected in parallel. The number in use and the state of the rare earth recycling tanks are controlled by a valve. After the rare earth recycling material in the rare earth recycling tank reaches saturated adsorption, the rare earth recycling material is desorbed using a hydrochloric acid solution to obtain desorption solution, or the rare earth slurry. The desorption solution may be collected in a rare earth slurry recycling tank.

(4) The pH of the wastewater in the sedimentation tank is adjusted to 10-13 using alkali. After standing for a moment, the wastewater with adjusted pH flows to an intermediate water tank 3 by overflowing. The wastewater in the intermediate water tank 3 is then drained to an ammonia degassing device using a lift pump. In the ammonia degassing unit, ammonia nitrogen is converted into ammonia, and the ammonia is sucked to a gas-liquid separator using a vacuum pump. In certain embodiments, the wastewater after removing ammonia has low concentration of ammonia nitrogen or low concentration of nitrogen, and thus may be called low nitrogen wastewater. The wastewater in the ammonia degassing device is drained after the degassing treatment. The ammonia nitrogen in the drained wastewater is detected. If the drained wastewater from the ammonia degassing device meets a required standard, the drained wastewater is discharged directly via a drain pipe. In certain embodiments, the standard may be a threshold value, such as a concentration of nitrogen in the wastewater. If the drained wastewater from the ammonia degassing device does not meet the required standard, the drained wastewater from the ammonia degassing device is guided to a gas-liquid separation membrane module. The ammonia nitrogen in the wastewater is treated by controlling the pressure difference between the exterior and interior of the membrane, such that the wastewater travels inside the membrane and the absorbing solution sulfuric acid travels outside the membrane. After the treatment, the wastewater that meets the required standard is discharged, and the absorbing solution returns to the reaction tank via a pipe.

(5) After separation in the gas-liquid separator, the separated ammonia gas is drawn to an aqueous ammonia preparation system by a suction fan. The aqueous ammonia preparation system includes a gas-liquid separation membrane, a deionized water cooling assembly, and an aqueous ammonia collection tank. The ammonia is allowed to enter inside the gas-liquid separation membrane, and diffuse from interior to exterior of the membrane by controlling the pressure difference between the exterior and interior of the membrane. The diffused ammonia is absorbed using deionized water that is cooled to below 5° C., to obtain pure aqueous ammonia which is collected into the aqueous ammonia collection tank. The heat generated during cooling the deionized water is used to heat the ammonia degassing device in Step (4) by means of heat exchange.

Example 1

A wastewater from rare earth mining was provided. The determined rare earth content of the wastewater was 34.4 mg/L, and the determined ammonia nitrogen concentration of the wastewater was 293.2 mg/L. The wastewater is fed to an oil separator tank at a flow rate of 1000 L/h, stood for a moment, and then removed of the oil. The wastewater after oil removal was guided to a reaction tank, adjusted to pH 3-5 with sodium hydroxide, and fed to an intermediate water tank 1 by overflowing. The wastewater with adjusted pH in the intermediate water tank 1 was introduced by using a lift pump sequentially to a walnut shell filter tank, a manganese sand filter tank, a quartz sand filter tank, and an activated carbon filter tank in a pretreatment system for clarification (or purification). The wastewater after treatment was introduced to an intermediate water tank 2. The wastewater in the intermediate water tank 2 was introduced to a rare earth recycling tank using a lift pump at a flow rate of 100 L/h. The recycling tank was filled with a self-developed weakly acidic ion exchange fiber. The wastewater was flowed to a sedimentation tank after the rare earth in the wastewater was recycled. After the weakly acidic ion exchange fiber in the rare earth recycling tank reached saturated adsorption, the weakly acidic ion exchange fiber was desorbed with a 2 mol/L hydrochloric acid solution. The desorption solution was fed to a rare earth slurry recycling tank, and the rare earth recovery rate was 92.50%. The wastewater in the sedimentation tank was added with sodium hydroxide, to adjust the pH to about 11. After the precipitate was settled down to the bottom of the tank, the wastewater with adjusted pH was introduced by overflowing to an intermediate water tank 3. The wastewater in the intermediate water tank 3 was pumped to an ammonia degassing device using a lift pump. The ammonia degassing device was heated to about 40° C., and ammonia nitrogen in the ammonia degassing device was converted into ammonia. The ammonia was drawn into a gas-liquid separator using a suction fan. The wastewater removed of ammonia was discharged via a drain pipe, the ammonia nitrogen concentration in the discharged wastewater was 4.51 mg/L, and ammonia nitrogen removing rate was 98.46%, which meets the provision for ammonia nitrogen concentration of 15 mg/L in Emission Standards of Pollutants from Rare Earths Industry (GB 26451-2011). After separation in the gas-liquid separator, the ammonia was drawn to an aqueous ammonia preparation system by a suction fan. The ammonia was allowed to enter inside a gas-liquid separation membrane, and diffuse from interior to exterior of the membrane by controlling the pressure difference between the exterior and interior of the membrane, then absorbed with deionized water that was cooled to below 5° C. and functioned as an absorbent, and prepared into a 18.3% pure aqueous ammonia which was collected to an aqueous ammonia collection tank.

Example 2

A wastewater from rare earth smelting separation plant was provided. The determined rare earth content of the wastewater was about 360.33 mg/L, and the determined ammonia nitrogen concentration of the wastewater was about 210.89 mg/L. The wastewater is fed to an oil separator tank at a flow rate of 2000 L/h, stood for a moment, and then removed of the oil. The wastewater after oil removal was guided to a reaction tank, adjusted to pH 3-5 with sodium hydroxide, and fed to an intermediate water tank 1 by overflowing. The wastewater with adjusted pH in the intermediate water tank 1 was introduced by using a lift pump sequentially to a walnut shell filter tank, a manganese sand filter tank, a quartz sand filter tank, and an activated carbon filter tank in a pretreatment system for clarification. The wastewater after treatment was introduced to an intermediate water tank 2. The wastewater in the intermediate water tank 2 was introduced to a rare earth recycling tank using a lift pump at a flow rate of 500 L/h. The rear earth recycling tank was filled with a self-developed weakly acidic ion exchange non-woven fabric. The wastewater was flowed to a sedimentation tank after the rare earth in the wastewater was recycled. After the weakly acidic ion exchange non-woven fiber in the rare earth recycling tank reached saturated adsorption, the weakly acidic ion exchange non-woven fabric was desorbed with a 2 mol/L hydrochloric acid solution. The desorption solution was fed to a rare earth slurry recycling tank, and the rare earth recovery rate was 95.57%. The wastewater in the sedimentation tank was added with sodium hydroxide, to adjust the pH to about 13. After the precipitate was settled down to the bottom of the tank, the wastewater with adjusted pH was introduced by overflowing to an intermediate water tank 3. The wastewater in the intermediate water tank 3 was pumped to an ammonia degassing device using a lift pump. The ammonia degassing device was heated to about 50° C., and ammonia nitrogen in the ammonia degassing device was converted into ammonia. The ammonia was drawn into a gas-liquid separator using a suction fan. The wastewater removed of ammonia was fed to a gas-liquid separation membrane module, and the ammonia nitrogen in the wastewater was further treated with sulfuric acid as an absorbent by controlling the pressure difference between the exterior and interior of the membrane. After treatment, the wastewater was discharged via a drain pipe, where the ammonia nitrogen concentration in the discharged wastewater was 8.36 mg/L, and ammonia nitrogen removing rate was 96.04%, which meets the requirement for ammonia nitrogen concentration of 15 mg/L in Emission Standards of Pollutants from Rare Earths Industry (GB 26451-2011). After separation in the gas-liquid separator, the ammonia was drawn to an aqueous ammonia preparation system by a suction fan. The ammonia was allowed to enter inside a gas-liquid separation membrane, and diffuse from interior to exterior of the membrane by controlling the pressure difference between the exterior and interior of the membrane, then absorbed with deionized water that was cooled to below 5° C. (as an absorbent_, and prepared into a 17.5% pure aqueous ammonia which was collected to an aqueous ammonia collection tank.

Example 3

A wastewater from rare earth smelting separation plant was provided. The determined rare earth content of the wastewater was about 456.58 mg/L, and the determined ammonia nitrogen concentration of the wastewater was about 20036.66 mg/L. The wastewater is fed to an oil separator tank at a flow rate of 1500 L/h, stood for a moment, and then removed of the oil. The wastewater after oil removal was guided to a reaction tank, adjusted to pH 3-5 with sodium hydroxide, and fed to an intermediate water tank 1 by overflowing. The wastewater with adjusted pH in the intermediate water tank 1 was introduced using a lift pump sequentially to a walnut shell filter tank, a manganese sand filter tank, a quartz sand filter tank, and an activated carbon filter tank in a pretreatment system for clarification. The wastewater after treatment was introduced to an intermediate water tank 2. The wastewater in the intermediate water tank 2 was introduced to a rare earth recycling tank using a lift pump at a flow rate of 1000 L/h. The rare earth recycling tank was filled with a self-developed weakly acidic ion exchange non-woven fabric. The wastewater was flowed to a sedimentation tank after the rare earth in the wastewater was recycled. After the weakly acidic ion exchange fiber in the rare earth recovery tank reached saturated adsorption, the weakly acidic exchange non-woven fabric was desorbed with a 2 mol/L hydrochloric acid solution. The desorption solution was fed to a rare earth recycling tank, and the rare earth recovery rate was 91.30%. The wastewater in the sedimentation tank was added with sodium hydroxide t, to adjust the pH to about 12. After the precipitate was settled down to the bottom of the tank, the wastewater with adjusted pH was introduced by overflowing to an intermediate water tank 3. The wastewater in the intermediate water tank 3 was pumped to an ammonia degassing device using a lift pump. The ammonia degassing device was heated to about 35° C., and ammonia nitrogen in the ammonia degassing device was converted into ammonia. The ammonia was drawn into a gas-liquid separator using a suction fan. The wastewater removed of ammonia was discharged via a drain pipe, where the ammonia nitrogen concentration in the discharged wastewater was 1.56 mg/L, and ammonia nitrogen removing rate was 99.99%, which meets the requirement for ammonia nitrogen concentration of 15 mg/L in Emission Standards of Pollutants from Rare Earths Industry (GB 26451-2011). After separation in the gas-liquid separator, the ammonia was drawn to an aqueous ammonia preparation system by a suction fan. The ammonia was allowed to enter inside a gas-liquid separation membrane, and diffuse from interior to exterior of the membrane by controlling the pressure difference between the exterior and interior of the membrane, then absorbed with deionized water that was cooled to below 5° C. (as an absorbent), and prepared into a 21.0% pure aqueous ammonia which was collected to an aqueous ammonia collection tank.

Example 4

A wastewater from rare earth smelting separation plant was provided. The determined rare earth content of the wastewater was about 266.38 mg/L and the determined ammonia nitrogen concentration of the wastewater was about 10103.25 mg/L. The wastewater is fed to an oil separator tank at a flow rate of 1500 L/h, stood for a moment, and then removed of the oil. The wastewater after oil removal was guided to a reaction tank, adjusted to pH 3-5 with sodium hydroxide, and fed to an intermediate water tank 1 by overflowing. The wastewater with adjusted pH in the intermediate water tank 1 was introduced using a lift pump sequentially to a walnut shell filter tank, a manganese sand filter tank, a quartz sand filter tank, and an activated carbon filter tank in a pretreatment system for clarification. The wastewater after treatment was introduced to an intermediate water tank 2. The wastewater in the intermediate water tank 2 was introduced to a rare earth recycling tank by using a lift pump at a flow rate of 2000 L/h. The recycling tank was filled with a self-developed weakly acidic ion exchange non-woven fabric. The wastewater was flowed to a sedimentation tank after the rare earth in the wastewater was recycled. After the weakly acidic ion exchange fiber in the rare earth recycling tank reached saturated adsorption, the weakly acid ion exchange non-woven fabric (inorganic-organic composite ion exchange material) was desorbed with a 2 mol/L hydrochloric acid solution. The desorption solution was fed to a rare earth recycling tank, and the rare earth recovery rate was 93.30%. The wastewater in the sedimentation tank was added with sodium hydroxide, to adjust the pH to about 12.5. After the precipitate was settled down to the bottom of the tank, the wastewater with adjusted pH was introduced by overflowing to an intermediate water tank 3. The wastewater in the intermediate water tank 3 was pumped to an ammonia degassing device using a lift pump. The ammonia degassing device was heated to about 40° C., and ammonia nitrogen in the ammonia degassing device was converted into ammonia. The ammonia was drawn into a gas-liquid separator using a suction fan. The wastewater removed of ammonia was discharged via a drain pipe, where the ammonia nitrogen concentration in the discharged wastewater was 0.93 mg/L, and ammonia nitrogen removing rate was 99.99%, which meets the requirement for ammonia nitrogen concentration of 15 mg/L in Emission Standards of Pollutants from Rare Earths Industry (GB 26451-2011). After separation in the gas-liquid separator, the ammonia was drawn to an aqueous ammonia preparation system by a suction fan. The ammonia was allowed to enter inside a gas-liquid separation membrane, and diffuse from interior to exterior of the membrane by controlling the pressure difference between the exterior and interior of the membrane, then absorbed with deionized water that was cooled to below 5° C. (as an absorbent), and prepared into a 20.8% pure aqueous ammonia which was collected to an aqueous ammonia collection tank.

Example 5

A wastewater from rare earth mining was provided. The determined rare earth content of the wastewater was 38.31 mg/L and the determined ammonia nitrogen concentration of the wastewater was 786.40 mg/L. The wastewater is fed to an oil separator tank at a flow rate of 1000 L/h, stood for a moment, and then removed of the oil. The wastewater after oil removal was guided to a reaction tank, adjusted to pH 3-5 with sodium hydroxide, and fed to an intermediate water tank 1 by overflowing. The wastewater with adjusted pH in the intermediate water tank 1 was introduced by using a lift pump sequentially to a walnut shell filter tank, a manganese sand filter tank, a quartz sand filter tank, and an activated carbon filter tank in a pretreatment system for clarification. The wastewater after treatment was introduced to an intermediate water tank 2. The wastewater in the intermediate water tank 2 was introduced to a rare earth recycling tank using a lift pump at a flow rate of 3000 L/h. The recycling tank was filled with a self-developed weakly acidic ion exchange non-woven fabric. The wastewater was flowed to a sedimentation tank after the rare earth in the wastewater was recycled. After the weakly acidic ion exchange fiber in the rare earth recycling tank reached saturated adsorption, the weakly acidic ion exchange fiber was desorbed with a 2 mol/L hydrochloric acid solution. The desorption solution was fed to a rare earth slurry recycling tank, and the rare earth recovery rate was 97.30%. The wastewater in the sedimentation tank was added with sodium hydroxide, to adjust the pH to about 11. After the precipitate was settled down to the bottom of the tank, the wastewater with adjusted pH was introduced by overflowing to an intermediate water tank 3. The wastewater in the intermediate water tank 3 was pumped to an ammonia degassing device using a lift pump. The ammonia degassing device was heated to about 40° C., and ammonia nitrogen in the ammonia degassing device was converted into ammonia. The ammonia was drawn into a gas-liquid separator using a suction fan. The wastewater removed of ammonia was discharged via a drain pipe, where the ammonia nitrogen concentration in the discharged wastewater was 7.55 mg/L, and ammonia nitrogen removing rate was 99.04%, which meets the requirement for ammonia nitrogen concentration of 15 mg/L in Emission Standards of Pollutants from Rare Earths Industry (GB 26451-2011). After separation in the gas-liquid separator, the ammonia was drawn to an aqueous ammonia preparation system by a suction fan. The ammonia was allowed to enter inside a gas-liquid separation membrane, and diffuse from interior to exterior of the membrane by controlling the pressure difference between the exterior and interior of the membrane, then absorbed with deionized water that was cooled to below 5° C. and functioned as an absorbent, and prepared into a 19.3% pure aqueous ammonia which was collected to an aqueous ammonia collection tank.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for recycling rare earth from a wastewater from rare earth mining or from rare earth smelting, comprising:
   1) feeding the wastewater to an oil separator at a flow rate of 1000-3000 liters/hour (L/h), standing, removing oil from the wastewater to form a degreased wastewater, guiding the degreased wastewater to a reaction tank, adjusting pH of the degreased wastewater in the reaction tank to about 3-5, and feeding the degreased wastewater in the reaction tank to a first intermediate water tank by overflowing;
   2) feeding the degreased wastewater in the first intermediate water tank to a pretreatment system using a first lift pump, treating the degreased wastewater by the pretreatment system to obtain a purified wastewater, and guiding the purified wastewater to a second intermediate water tank;
   3) feeding the purified wastewater in the second intermediate water tank to at least one rare earth recycling tank filling with a rare earth recycling material at a flow rate of 100-3000 L/h, flowing the purified wastewater through the rare earth recycling material to obtain a low rare earth wastewater and guiding the low rare earth wastewater to a sedimentation tank, wherein after the rare earth recycling material reaches saturated adsorption, the rare earth recycling material is washed with hydrochloric acid to obtain a rare earth slurry;
   4) adjusting pH of the low rare earth wastewater in the sedimentation tank to about 10-13 using an alkali, standing, guiding the low rare earth wastewater to a third intermediate tank by overflowing, pumping the low rare earth wastewater in the third intermediate water tank to an ammonia degassing device using a third lift pump, converting ammonia nitrogen contained in the low rare earth wastewater in the ammonia degassing device into ammonia to obtain a low nitrogen wastewater, pumping the ammonia to a gas-liquid separator, and detecting a concentration of ammonia nitrogen in the low nitrogen wastewater in the ammonia degassing device, if the concentration of the ammonia nitrogen meets a predetermined standard, discharging the low nitrogen wastewater in the ammonia degassing device via a drain pipe, and if the concentration of the ammonia nitrogen does not meet the predetermined standard, guiding the low nitrogen wastewater to a gas-liquid separation membrane module, and further treating the ammonia nitrogen in the low nitrogen wastewater by controlling the pressure difference between an exterior and an interior of a membrane in the gas-liquid separation membrane module, such that the low nitrogen wastewater travels inside the membrane, and an absorbing solution sulfuric acid travels outside the membrane, and after the step of treating, discharging the low nitrogen wastewater that meets the predetermined standard, and returning the absorbing solution to the reaction tank;
   5) sucking the ammonia gas to an aqueous ammonia preparation system by a sucking fan to obtain aqueous ammonia.

2. The method of claim 1, wherein the pretreatment system comprises a walnut shell filter tank, a manganese sand filter tank, a quartz sand filter tank, and an activated carbon filter tank.

3. The method of claim 1, wherein the rare earth recycling material comprises a weakly acidic ion exchange fiber, a weakly acidic ion exchange fabric, or an inorganic-organic composite ion exchange material.

4. The method of claim 1, wherein the at least one rare earth recycling tank comprises a first rare earth recycling tank and a second rare earth recycling tank connected in parallel and controlled by a valve, when the rare earth recycling material in one of the at least one rare earth recycling tank reaches saturated adsorption, the valve is switched to close the one of the at least one rare earth recycling tank and open the other one of the at least one rare earth recycling tank, and the rare earth recycling material in the one of the at least one rare earth recycling tank is washed using the hydrochloric acid to obtain the rare earth slurry.

5. The method of claim 1, wherein the aqueous ammonia preparation system comprises a gas-liquid separation membrane, a deionized water cooling assembly, and an aqueous ammonia collection tank, wherein the ammonia gas is allowed to enter inside the gas-liquid separation membrane, and diffuses from interior to exterior of the gas-liquid separation membrane by controlling the pressure difference between the exterior and the interior of the gas-liquid separation membrane, then the ammonia gas diffused inside the gas-liquid separation membrane is absorbed with deionized water that is cooled to below 5° C. to form the aqueous ammonia, and the aqueous ammonia is fed to the aqueous ammonia collection tank, and wherein heat generated during cooling of the deionized water is used by the ammonium degassing device through a heat exchanger.

6. A method for recycling rare earth from a wastewater from rare earth mining or from rare earth smelting, comprising:

Removing oil from the wastewater to obtain a degreased wastewater, said removing comprising feeding the wastewater to an oil separator at a flow rate of 1000-3000 liters/hour (L/h), standing, removing the oil to form the degreased wastewater, guiding the degreased wastewater to a reaction tank, and adjusting the pH of the degreased wastewater to a pH of about 3-5;

Purifying the degreased wastewater to obtain a purified wastewater using a pretreatment system;

Recycling rare earth from the purified wastewater to obtain a rare earth slurry and a low rare earth wastewater using a rare earth recycling tank;

Treating the low rare earth wastewater to obtain ammonia gas using an ammonium degassing device; and Converting the ammonia gas to obtain aqueous ammonia using an aqueous ammonium preparing system.

7. The method of claim 6, wherein the step of purifying the degreased wastewater to obtain the purified wastewater comprises:

feeding the degreased wastewater to the pretreatment system; and treating the degreased wastewater by the pretreatment system to obtain the purified wastewater; and guiding the purified wastewater to a second intermediate water tank.

8. The method of claim 7, wherein the pretreatment system comprises a walnut shell filter tank, a manganese sand filter tank, a quartz sand filter tank, and an activated carbon filter tank.

9. The method of claim 6, wherein the step of recycling the rare earth from the purified wastewater to obtain the rare earth slurry and the low rare earth wastewater comprises:

feeding the purified wastewater to one of at least one rare earth recycling tank at a flow rate of 100-3000 L/h, wherein the rare earth recycling tank is filled with a rare earth recycling material;

flowing the purified wastewater through the rare earth recycling material to obtain the low rare earth wastewater and guiding the low rare earth wastewater to a sedimentation tank; and washing the rare earth recycling material with hydrochloric acid after the rare earth recycling material reaches saturated adsorption, to obtain the rare earth slurry.

10. The method of claim 9, wherein the rare earth recycling material comprises a weakly acidic ion exchange fiber, a weakly acidic ion exchange fabric, or an inorganic-organic composite ion exchange material.

11. The method of claim 9, wherein the at least one rare earth recycling tank comprises a first rare earth recycling tank and a second rare earth recycling tank connected in parallel and controlled by a valve, when the rare earth recycling material in one of the at least one rare earth recycling tank reaches saturated adsorption, the valve is switched to close the one of the at least one rare earth recycling tank and open the other one of the at least one rare earth recycling tank, and the rare earth recycling material in the one of the at least one rare earth recycling tank is washed using the hydrochloric acid to obtain the rare earth slurry.

12. The method of claim 6, wherein the step of treating the low rare earth wastewater to obtain the ammonia gas comprise:

guiding the low rare earth wastewater to a sedimentation tank;

adjusting pH of the low rare earth wastewater in the sedimentation tank to about 10-13 using an alkali, and standing;

guiding the low rare earth wastewater with adjusted pH to a third intermediate tank by overflowing; and pumping the low rare earth wastewater with adjusted pH in the third intermediate water tank to an ammonia degassing device using a lift pump.

13. The method of claim 12, wherein the step of treating the low rare earth wastewater to obtain the ammonia gas further comprise:

converting ammonia nitrogen contained in the low rare earth wastewater with adjusted pH in the ammonia degassing device into ammonia to obtain a low nitrogen wastewater, and sucking the ammonia to a gas-liquid separator;

detecting a concentration of ammonia nitrogen in the low nitrogen wastewater in the ammonia degassing device:

if the concentration of ammonia nitrogen in the low nitrogen wastewater is less than a predetermined threshold, discharging the low nitrogen wastewater in the ammonia degassing device via a drain pipe; and if the concentration of ammonia nitrogen in the low nitrogen wastewater is greater than the predetermined threshold, guiding the low nitrogen wastewater to a gas-liquid separation membrane module, and further treating the ammonia nitrogen in the low nitrogen wastewater by controlling the pressure difference between an exterior and an interior of a membrane in the gas-liquid separation membrane module, such that the low nitrogen wastewater travels inside the membrane, and an absorbing solution sulfuric acid travels outside the membrane, and after the step of treating, discharging the low nitrogen wastewater.

14. The method of claim 6, wherein the step of converting the ammonia gas to obtain the aqueous ammonia comprises sucking the ammonia gas to an aqueous ammonia preparation system by a sucking fan.

15. The method of claim 14, wherein the aqueous ammonia preparation system comprises a gas-liquid separation membrane, a deionized water cooling assembly, and an aqueous ammonia collection tank, and during the step of converting the ammonia gas to obtain the aqueous ammonia, the ammonia gas is allowed to enter inside the gas-liquid separation membrane, and diffuse from interior to exterior of the gas-liquid separation membrane by controlling the pressure difference between the exterior and the interior of the gas-liquid separation membrane, then the ammonia gas diffused inside the gas-liquid separation membrane is absorbed with deionized water that is cooled to below 5° C. to form the aqueous ammonia, and the aqueous ammonia is fed to the aqueous ammonia collection tank.

16. The method of claim 15, wherein heat generated during cooling of the deionized water is used by the ammonium degassing device through a heat exchanger.

* * * * *